United States Patent [19]

Chou

[11] Patent Number: 6,159,331
[45] Date of Patent: Dec. 12, 2000

[54] METHOD OF USING BRIDGING AGENT FOR LAMINATES

[75] Inventor: Ying-Cheng Chou, Middletown, Ohio

[73] Assignee: Formica Corporation, Cincinnati, Ohio

[21] Appl. No.: 09/210,029

[22] Filed: Dec. 11, 1998

Related U.S. Application Data

[62] Division of application No. 08/953,907, Oct. 20, 1997, abandoned.

[51] Int. Cl.$^7$ .................................................. C09J 101/00
[52] U.S. Cl. ........................ 156/331.3; 156/231; 156/278; 156/307.4; 428/420; 525/281; 525/445
[58] Field of Search ................................ 156/231, 331.3, 156/278, 307.4; 428/420; 525/281, 445

[56] References Cited

U.S. PATENT DOCUMENTS

| | | | |
|---|---|---|---|
| 2,712,004 | 6/1955 | Thomas | 525/445 |
| 3,537,950 | 11/1970 | Hale | 428/530 |
| 4,132,822 | 1/1979 | Wismer et al. | 156/278 |
| 4,869,957 | 9/1989 | Vankerckhoven et al. | 428/420 |
| 5,002,808 | 3/1991 | Hahn et al. | 428/420 |

FOREIGN PATENT DOCUMENTS

| | | | |
|---|---|---|---|
| 1315500 | 5/1973 | United Kingdom | 428/420 |

*Primary Examiner*—John J. Gallagher
*Attorney, Agent, or Firm*—Mayer, Brown & Platt

[57] ABSTRACT

A bridging agent for improving the bond between incompatible component layers of laminates comprising one or more N-substituted melamine compounds. The bridging agent is comprised of an N-substituted melamine, an N-substituted melamine formaldehyde resin, a hybrid N-substituted melamine resin, or mixtures of these resins. The bridging agent improves bonding between laminate layers known not to bond well together such as between a styrenated polyester top coat and a melamine impregnating resin. As a result of improving the bond between the incompatible component layers, the bridging agent improves the blister resistance and cove forming characteristics of the laminate. The bridging agent can be used to improve bonding both with and without an overlay paper layer.

10 Claims, No Drawings

METHOD OF USING BRIDGING AGENT FOR LAMINATES

This is a divisional of U.S. patent application Ser. No. 08/953,907, filed Oct. 20, 1997, now abandoned.

BACKGROUND OF THE INVENTION

1. Field of the Invention

The present invention relates to a bridging agent for improving bonding between incompatible component layers of a laminate. The bridging agent comprises an N-substituted melamine, an N-substituted melamine formaldehyde resin, a hybrid N N-substituted melamine formaldehyde resin, a hybrid N-substituted melamine resin, or various mixtures thereof. The N-substituted melamine has at least one radical group that is an ethylenically unsaturated hydrocarbon containing 3 to 4 carbons. The remaining radical groups are selected from a group comprising hydrogen, ethylenically unsaturated hydrocarbons containing 3 to 4 carbons, alkyl, cycloakyl, aryl, alkaryl, and aralkyl radicals. Exemplary hybrid N-substituted melamine resin are an N-substituted melamine and unsaturated polyester resin, a novel N-substituted melamine formaldehyde and unsaturated polyester resin, and an N-substituted melamine and acrylic resin.

More specifically, the present invention is directed to the use of derivatives of N-substituted melamines to improve the interfacial bond between incompatible component layers of a laminate, for example, between a protective top coat, such as a styrenated polyester, and a melamine resin treated sheet. The present invention is further directed to a method of forming a laminate with improved bonding between incompatible component layers which produces a laminate with better performance characteristics than the prior art laminate products.

2. Description of Related Art

High pressure decorative laminates are conventionally produced by stacking and curing under heat and pressure a plurality of layers of paper impregnated with various synthetic thermosetting resins. The typical build-up, from the bottom up, consists of multiple, for example three to eight, core filler sheets made from phenolic resin impregnated kraft paper. Above the core filler sheets is a decorative sheet impregnated with melamine resin. The decorative sheet can be either a solid color or a print. When a print sheet is used, it is necessary to have an overlay sheet impregnated with melamine resin which, in the laminate, is almost transparent and provides some physical and chemical protection for the print sheet. In other build-ups, having either a solid color or a print decorative sheet, a resin top coat is used to provide chemical protection for the laminate. Without a top coat, decorative sheets impregnated with conventional melamine resins do not have good chemical and physical damage resistance. Unsaturated resins, for example, styrenated polyester, are known in the art as good top coat resins that improve chemical and physical resistance. While providing good top coat properties, unsaturated resins do not bond well to some of the other resins that may be used in the laminate, such as formaldehyde-reactive resins. As an example, styrenated polyester does not bond well to melamine-formaldehyde resin. Consequently, the resulting laminate exhibits separation of the component layers as manifested by blistering and, in severe cases, total de-lamination. Poor bonding between component layers is particularly noticeable when the laminate is formed post-production; that is, when an inside bend is made to form the backsplash of a counter-top.

In order to improve the bond between incompatible layers such as polyester and melamine, the prior art discloses interposing an overlay paper layer, or intermediate dry sheet, at the interface of the incompatible layers. During lamination, the incompatible resins remain separated and penetrate opposite sides of the overlay paper layer. While this technique addresses the lack of direct bonding between incompatible resins such as styrenated polyester and melamine resins, it requires precise control of the amounts and flow characteristics of the polyester and melamine resins so that both sides of the overlay paper layer are coated equally. Both the polyester and melamine resin must flow evenly onto opposite sides of the raw layer and cure at the same rate in order for the raw layer to be effective at improving the bond between the incompatible layers. If the melamine resin flows onto the raw layer and cures first, the polyester resin will not be able to penetrate the raw layer, and vice versa. As a result, the interfacial bond is poor. A further disadvantage of this technique is that, at most, a physical bond, rather than a chemical bond, is created.

In view of the above, there remains a need for a technique to improve bonding between incompatible laminate component layers. For example, there remains a need for a technique to improve bonding between laminate top coats, such as styrenated polyester top coats, and melamine resin impregnated decorative sheets. By improving the bond between incompatible layers, the blister resistance and post-forming characteristics of the resulting laminate would be improved. Further, there remains a need for an agent that can be directly applied to the incompatible layers and to an overlay layer, if a raw layer is desired for other reasons.

SUMMARY OF THE INVENTION

The purpose and advantages of the invention will be set forth in and apparent from the description that follows, as well as will be learned by practice of the invention. Additional advantages of the invention will be realized and attaintd by the elements of the composition and method particularly pointed out in the appended claims.

The present invention is directed to a bridging agent for improving the bond between incompatible component layers of laminates. The bridging agent comprises a derivative of an N-substituted melamine having radical groups R and R', where R is an ethylenically unsaturated hydrocarbon having between 3 and 4 carbon atoms and R' is either a hydrogen, ethylenically unsaturated hydrocarbon having 3 to 4 carbons, alkyl, cycloalkyl, aryl, alkaryl, or aralkyl radical. The bridging agent can comprise an N-substituted melamine resin, an N-substituted melamine formaldehyde resin, a novel hybrid N-substituted melamine, or mixtures of such resins.

Exemplary N-substituted melamines are N,N-diallyl melamine, N,N'-diallyl melamine, and N,N',N"-triallyl melamine. Examples of hybrid of N-substituted melamine resins include N-substituted melamine and unsaturated polyester resin, a novel N-substituted melamine formaldehyde and unsaturated polyester resin, and N-substituted melamine and acrylic resin. In particular, the bridging agent of the invention can be a melamine-polyester hybrid that is the reaction product of N,N-diallyl melamine and an unsaturated polyester.

The unsaturated polyesters used to form the melamine-polyester hybrid resins of the invention comprise, but are not limited to, either reaction products of glycols and unsaturated dicarboxylic acids or reaction products of glycols and unsaturated dicarboxylic acids and saturated dicarboxylic acids. The glycol can comprise one or more of propylene glycol, dipropylene glycol, ethylene glycol, neopentyl glycol, 1,3-propanediol, 1,2-butanediol, or 1,4-butanediol. The saturated dicarboxylic acid can be one or more of phthalic acid, isophthalic acid, terephthalic acid, adipic acid, succinic acid, pimelic acid, suberic acid, azelaic acid, aebacic acid, and their anhydrides. The unsaturated dicarboxylic acid can be one or more of maleic acid, fumaric acid, and their anhydrides.

The objects and advantages of the present invention are further achieved by a method of producing a laminate with improved bonding between incompatible component layers. The method of the invention comprises the steps of preparing a bridging agent solution, depositing the bridging agent solution at the interface between the incompatible component layers of the laminate, and curing the component layers under heat and pressure. In practicing the method of the present invention, the bridging agent solution may be deposited either directly onto the incompatible layers or onto an overlay paper layer inserted between the incompatible layers. For example, the bridging agent solution can be deposited onto either a polyester top coat, an overlay layer, or a melamine-treated decorative sheet by conventional gravure printing techniques. The component layers of laminate may also be treated with various thermosetting resins according to conventional treating techniques known in the laminate art. The composite of component layers is then cured with heat and pressure by means well known in the art.

It is to be understood that both the foregoing general description and the following detailed description are exemplary and provided for purposes of explanation only, and are not restrictive of the invention as claimed.

DETAILED DESCRIPTION OF THE PREFERRED EMBODIMENT

Reference will now be made in detail to the present preferred embodiment of the bridging agent of the invention, examples of which are provided below. The bridging agent of the invention advantageously improves the bond between incompatible component layers of a laminate. For example, the bridging agent can improve the bond between a top coat resin and a resin used to treat the decorative or substrate layers of the laminate when those resins are known to be chemically incompatible. In a different laminate build-up, the bridging agent can be used to improve the bonding between other incompatible layers such as between a decorative sheet and the sheets underlying the decorative sheet.

The bridging agent of the invention is effective for improving the bond between incompatible resins such as between a polyester resin and a melamine resin. Additionally, the bridging agent can improve the bond between any unsaturated resin and any formaldehyde reactive resin, as well as improving the blister resistance, and post-forming characteristics of the resulting laminate. Examples of unsaturated resins include acrylics, styrenated polyester, vinyl ester, and alkyd resins. Similarly, examples of formaldehyde reactive resins include melamine-formaldehyde, urea-formaldehyde, and phenol-formaldehyde.

When used to improve the bond between an unsaturated top coat resin and a formaldehyde reactive resin, the mechanism of improved bonding is presently understood to involve polymerization. The N-substituted melamine component of the bridging agent is presently believed to polymerize with both the unsaturated top coat resin and the formaldehyde reactive resin. The unsaturated carbon double bonds (vinylene or allylic groups) of the N-substituted melamine are believed to polymerize with the carbon double bonds of the unsaturated top coat resin. Between the bridging agent and the formaldehyde reactive resin, the imino (—NH) or amino (—NH$_2$) groups of the N-substituted melamine molecules are believed to polymerize with the formaldehyde reactive groups of the resin. The reaction between the imino or amino groups and the formaldehyde reactive groups would therefore be an aldehyde condensation reaction. Examples of formaldehyde reactive groups include methylol and alkylated groups, such as (—NHCH$_2$OH) and (—NHCH$_2$OR), respectively.

The bridging agent of the invention comprises an N-substituted melamine, an N-substituted melamine formaldehyde resin, a novel hybrid N-substituted melamine resin, or mixtures of these resins. The N-substituted melamine has the general formula:

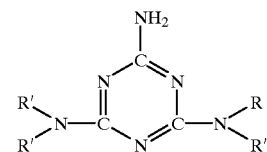

Within the general formula, R is an ethylenically unsaturated hydrocarbon radical having three to four carbons. Examples of R include allyl, methallyl, propenyl, isopropenyl, 1-butenyl, 2-butenyl, 3-butenyl and 1,3-butandienyl radicals. Radical R' can be either R or a hydrogen, alkyl, cycloalkyl, aryl, alkaryl, or aralkyl radical.

As stated above, the bridging agent can also comprise an N-substituted melamine, an N-substituted melamine formaldehyde resin, a hybrid N-substituted melamine resin, a hybrid N-substituted melamine formaldehyde resin, or a mixture of more than one of these resins. In forming a hybrid resin, N-substituted melamine can be hybridized with a variety of unsaturated thermosetting resins including acrylics, vinyl ester, unsaturated polyesters, unsaturated alkyds, or other resins containing a carbon-carbon double bond. Examples of hybrid N-substituted melamine resins include, but are not limited to, N-substituted melamine and unsaturated polyester resin, N-substituted melamine formaldehyde and unsaturated polyester resin, and N-substituted melamine and acrylic resin. Unsaturated polyester resins used to form hybrid resins can be reaction products of glycols and unsaturated dicarboxylic acids or products of glycols and unsaturated and saturated dicarboxylic acids. Particularly, the unsaturated polyester is the reaction product of dipropylene glycol and maleic anhydride. In a preferred embodiment, the glycol is selected from a group comprising propylene glycol, dipropylene glycol, ethylene glycol, neopentyl glycol, 1,3-propanediol, 1,2-butanediol, 1,4-butanediol and mixtures of these glycols. Likewise, the saturated dicarboxylic acid can be selected from a group comprising one or more of phthalic acid, isophthalic acid, terephthalic acid, adipic acid, succinic acid, pimelic acid, suberic acid, azelaic acid, aebacic acid, and their anhydrides. The unsaturated dicarboxylic acid is selected from a group comprising one or more of maleic acid, fumaric acid, and their anhydrides.

The acrylic resin used to form the hybrid resin, N-substituted melamine and acrylic resin, can be selected from a group comprising one or more difunctional monomers, trifunctional monomers, or oligomers. Examples of difunctional monomers include, but are not limited to, triethylene glycol dimethacrylate, ethylene glycol dimethacrylate, tetraethylene glycol dimethacrylate, polyethylene glycol dimethacrylate, polyethylene glycol diacrylate, ethoxylated bisphenol A diacrylate, and mixtures of these monomers. Likewise, examples of trifunctional monomers include trimethylol-propane trimethacrylate, ethoxylated trimethylpropane triacrylate, and mixtures of such monomers. Appropriate oligomers include urethane acrylate, urethane methacrylate, epoxy acrylate, epoxy methacrylate, and mixtures of such oligomers.

In one embodiment of the invention, the bridging agent is comprised of an N-substituted melamine such as N,N-diallyl melamine. In this embodiment, the N,N-diallyl melamine is able to bond with an unsaturated top coat component, such as through vinyl addition, and with the formaldehyde reactive resin, such as through formaldehyde condensation. In addition to N,N-diallyl melamine, the following are representative N-substituted melamines that act as major components of bridging agents encompassed by the invention: N-allyl melamine, N-methallyl melamine, N,N'diallyl melamine, N,N-dimethallyl melamine, N,N',N"-triallyl melamine, N,N,N'-triallyl melamine, N,N,N',N'-tetrallyl melamine, N,N,N'-tri-(methallyl) melamine, N,N,N',N'-tetra-(methallyl) melamine, N-allyl-N-methyl melamine, N-allyl-N-benzyl melamine, N-allyl-N-tolyl melamine, N-allyl-N-phenyl melamine, N-allyl-N'-methyl melamine, N-allyl-N'-benzyl melamine, N-methallyl-N'-tolyl melamine, N-methallyl-N'-benzyl melamine, and N,N-diallyl-N',N'-dimethyl melamine. Other appropriate N-substituted melamines are contemplated by the invention and would be apparent to one of skill in the art from consideration of the general formula as well as from consideration of the provided examples.

N,N-diallyl melamine ("DAM") monomer is a white crystalline (orthorhombic) solid having a melting point of 145° C. and a density of 1.242 g/ml at 30° C. DAM monomer has low solubility in water, less than 0.01%, as well as low solubility in vinyl and allyl monomers. DAM monomer improves the bond between typically incompatible polyester resins and melamine resins. While DAM as a bridging agent improves bonding, the process of treating component layers of the laminate with DAM monomer can be difficult. In a conventional treating process, thermosetting resins need to be dissolved in suitable solvents or monomers to form a homogenous solution. The solids content of the resin solution has to be adjusted for meeting the viscosity and resin pick-up requirements. Because of the limited solubility of DAM in various solvents and monomers at room temperature, forming a high solids resin solution becomes difficult and, therefore, treatment of component layers with DAM is not simple.

As stated above, the bridging agent of the invention can comprise an N-substituted melamine formaldehyde resin. DAM is an example of an N-substituted melamine that can be used to form such a formaldehyde resin. DAM-formaldehyde resin is prepared by reacting DAM with formalin (37% solution of formaldehyde) in a molar ratio of F/DAM=0.85 at 100° C. for about one hour. For use as a bridging agent, the DAM-formaldehyde resin is prepared as a 30% by weight solution in isopropyl alcohol.

Various hybrid resin bridging agents can be prepared with DAM as the N-substituted melamine component. For example, a hybrid DAM-unsaturated polyester resin can be prepared by reacting 50% by weight of DAM with 50% by weight of unsaturated polyester at 160° C. for three hours. When used as a bridging agent, hybrid DAM-unsaturated polyester resin is prepared as a 10% by weight solution in isopropyl alcohol. In another example, a hybrid N-substituted melamine formaldehyde and unsaturated polyester resin, DAM-formaldehyde/unsaturated polyester resin, can be prepared by reacting DAM with 37% formalin at a molar ratio of F/DAM=0.85 at 100° C. and then reacting the resulting prepolymer with an unsaturated polyester at a prepolymer/unsaturated polyester weight ratio of 60:40. When used as a bridging agent, the DAM-formaldehyde/unsaturated polyester hybrid resin is prepared as 50% weight solid in a solvent consisting of 70% isopropyl alcohol and 30% acetone.

In the preferred embodiment, an exemplary source of DAM is Monomer-Polymer, of Feasterville, Pa. The unsaturated polyester that is reacted with the DAM to produce the DAM-unsaturated polyester hybrid resin can be unsaturated polyester MR1208A, containing no styrene and supplied by Ashland Chemicals of Columbus, Ohio. Other unsaturated polyesters that are prepared by reacting dipropylene glycol with maleic anhydride at a certain weight ratio and have an acid value of 15 and an OH value of about 60 can also be used. The 37% formalin used to synthesize the DAM-formaldehyde resin can be obtained from Capital Resin Corporation of Columbus, Ohio.

As stated previously, it is known in the art that styrenated polyester does not bond well to melamine-formaldehyde resins. One method known in the art for promoting the bond between the styrenated polyester and the melamine is to interpose an overlay paper layer between the polyester and the melamine treated sheets of the laminate. One of the objectives of the present invention is to provide a bridging agent that enhances the bond between incompatible resins, such as between polyester and melamine resins, with or without the presence of an overlay layer. In order to demonstrate the advantages of the present invention, a representative styrenated polyester resin was formulated for use as a top coat. The composition of such a polyester top coat can comprise the following: styrenated polyester resin such as S971UA as can be obtained from Silmar Resin of Fort Wright, Ky.; approximately 1% by weight of a photo initiator such as Irgacure 1700 as can be obtained from Ciba-Geigy Corporation of Hawthorne, N.Y.; approximately 1% of a peroxide catalyst such as Esperox 10 as can be obtained from Whitco Corporation of Marshall, Tex.; approximately 1% of a U.V. absorber such as Tinuvin 292 as can be obtained from Ciba-Geigy Corporation; approximately 0.5% of an antioxidant such as Irganox 1010 as can be obtained from Ciba-Geigy Corp.; approximately 3% of an abrasive such as WCA 9S as can be obtained from Micro Abrasives Corporation of Westfield, Mass.; and approximately 0.5% of a wax such as BYK S-740 as can be obtained from BYK-Chemie of Wallingford, Conn.

In order to demonstrate some of the benefits of the present invention, three different laminate build-ups, were selected to demonstrate the effectiveness of the bridging agent of the invention for improving the bond between incompatible resins. In the three representative laminate build-ups, the incompatible resins are a styrenated polyester top coat and melamine resin impregnated decorative layers. To form the polyester top coat, the styrenated polyester resin was mixed with photoinitiators and other ingredients and was coated to a clay-coated release sheet by conventional reverse roll coating techniques. The pressure of the rolls was adjusted in such a way that the film thickness was controlled between 5–10 mils. The coated sheet passed through an ultraviolet light source where the liquid resin was cured to a semisolid state. As the coated release sheet exited the coater, the semisolid film was interleaved with a polyethylene film for temporary storage prior to its use in the aforementioned lay-up. To prepare the melamine-treated sheet, a raw decorative paper was impregnated in the normal manner with suitable melamine-formaldehyde resins, the sheet was dried in an oven to remove volatile solvents, and the sheet was wound into a roll for storage.

The build-ups vary by location of deposit of the bridging agent and vary by having an overlay paper layer and not having a raw layer. As can be seen in Table 1 below, laminate build-up #1 has a thin layer of the bridging agent on the styrenated polyester top coat. Laminate build-up #2 has the bridging agent as a thin layer coated on the melamine treated sheets. Laminate build-up #3 is prepared to demonstrate the effect of the presence of an overlay paper layer that has been coated with the bridging agent. To treat the styrenated polyester top coat in build-up #1, the bridging resin was coated to the polyester top coat by gravure printing techniques. The coated sheet was dried in an oven to remove volatile solvents and then it was interleaved with a polyethylene film for temporary storage. To treat the melamine sheet in build-up #2, the bridging resin was coated to the melamine treated sheet by the gravure method. The coated sheet was dried in an oven to remove volatile solvents and wound into a roll for storage. To treat the overlay layer in build-up #3, the bridging resin was coated to the overlay paper by the gravure method. "Trans paper" is an abbreviation for "translucent" or "transparent" paper and refers to the overlay paper. The treated overlay paper was dried in an oven to remove volatile solvents and wound into a roll for storage. After all the component layers were treated, predetermined lengths of the polyester top coat (clay-coated release sheet plus styrenated polyester film) and melamine treated decorative layer were layed-up with standard phenolic treated fillers and consolidated under pressure and heat in a press. The laminate was cooled for about 25 minutes and removed from the press.

TABLE 1

| Build-Up #1 | Build-Up #2 | Build-Up #3 |
| --- | --- | --- |
| -clay coated release | -clay coated release | -clay coated release |
| -6–7 mils of a styrenated polyester coated with a thin layer of bridging agent | -6–7 mils of a styrenated polyester | -6–7 mils of a styrenated polyester |
| -no overlay layer | -no overlay layer | -20–25 gsm trans paper (overlay layer) treated with bridging agent |
| -melamine treated sheet | -melamine treated sheet coated with a thin layer of bridging agent | -melamine treated sheet |
| -standard phenolic fillers | -standard phenolic fillers | -standard phenolic fillers |

The derivatives of N-substituted melamines comprising the bridging agents of the invention can be prepared at various reaction temperatures and held at those reaction temperatures for various reaction times. Another variable in preparation of the bridging agents is the method of synthesis. One method of synthesis is a bulk polymerization carried out in the absence of solvent. A second method involves solution synthesis in which polymerization is carried out in the presence of solvent, such as 2-butanol or isopropyl alcohol; the solvent must be carefully selected to avoid chain transfer. Additionally, synthesis can be done in either one or two steps. The one-step synthesis method involves charging all the components to the reactor before the reaction takes place. The two-step synthesis method, however, first requires preparation of a DAM-formalin prepolymer, prior to charging with MRI 208A to complete the polymerization. Various bridging agents of the invention were prepared in accordance with the parameters detailed in Table 2 below. The bridging agent resins described in Table 2 include N-substituted formaldehyde resins and various hybrid N-substituted melamine resins such as N-substituted melamine and unsaturated polyester resins.

TABLE 2

| | raw material | reaction temp. (° C.) | reaction time (min) | synthesis method | resin color |
| --- | --- | --- | --- | --- | --- |
| Resin 1 | MR1208A: 65 g<br>DAM: 35 g | 160 | 180 | bulk/one-step | brown |
| Resin 2 | MR1208A: 50 g<br>DAM: 50 g | 160 | 180 | bulk/one-step | brown |
| Resin 3 | formalin: 40 g<br>DAM: 60 g | 50 | 50 | solution/one-step | slightly yellow |
| Resin 4 | formalin: 25 g<br>DAM: 75 g | 60 | 70 | solution/one-step | slightly yellow |
| Resin 5 | formalin: 16 g<br>DAM: 51 g<br>MR1208A: 33 g | 100 | 60 | bulk/one-step | slightly yellow |
| Resin 6 | formalin: 25 g<br>DMA: 75 g | 100 | 75 | bulk/one-step | slightly yellow |
| Resin 7 | formalin: 40 g<br>DAM: 60 g | 100 | 120 | bulk/one-step | slightly yellow |
| Resin 8 | formalin: 13.5 g<br>DAM: 40.8 g<br>MR1208A: 45.7 g | 100–110 | 120 | bulk/two-step | slightly yellow |
| Resin 9 | formalin: 16 g<br>DAM: 48 g<br>MR1208A: 36 g | 100–110 | 120 | bulk/two-step | slightly yellow |

In order to demonstrate the benefits of the present invention, laminates were formed using each of the three laminate build-ups described in Table 1 and using the bridging resins identified in Table 2. The laminates were prepared by pressing in either a 4'×10' or a 18"×20" press at a pressure of 1400 psi for approximately 25 minutes such that a maximum temperature of 135° C. was reached.

In order to determine the strength of the interfacial bond between the styrenated polyester and the melamine resin, and thereby the effectiveness of the bridging agent of the invention, cove forming, or inside bend, testing was performed on each of the laminates produced. An example of an occasion when a laminate would be formed to have an inside bend is the formation of a backsplash for a counter-top. If the cove-forming trait of a laminate is poor, when the laminate is shaped into a backsplash, the component layers will begin to come apart in a process known as de-lamination. The de-lamination is manifested by the formation of blisters.

In order to test cove forming characteristics, the cove forming equipment must be capable of producing a ⅛" inside radius bend, have a heater and controller capable of reaching 400° F. and holding the set temperature within a reasonable tolerance, and have a timer to time the preheat and automatically close the forming mold and hold it shut for the preselected hold time. Proper cove forming testing also requires timing of the hold down period. A test sample having dimensions of 6"×9", with the 9" dimension parallel to the sanding marks (cross direction) and the cove axis parallel to the cross direction, is needed for cove forming testing. Unless otherwise indicated, the cove forming tests were performed at 325° F. Prior to testing, the cove former was allowed 30 minutes to equilibrate at the test temperature. Next, the sample was preheated for a selected preheat time (e.g. 10–90 seconds), the cove was formed and held for the selected hold time (e.g. 30 seconds). The sample was removed from the cove forming equipment and the surface of the sample inspected for blisters. The rating system for the cove formed samples was as follows: "0" indicates a sample having no imperfections upon unaided visual inspection; "1" indicates a salable sample having some small blistering; "2" indicates a rejected sample having a fair and noticeable amount of blistering; and "3" indicates a rejected sample having severe blistering.

A first group of laminates was prepared using laminate build-up #1 which is laminate comprised of the following "layers": 1) a clay coated release paper; 2) 6–7 mils layer of a styrenated polyester coated with a thin layer of bridging agent resin; 3) a melamine treated sheet; and 4) standard phenolic fillers. Each of the DAM-based bridging agent resins were prepared as 43.5% solid polymers in isopropyl alcohol. To form the resins, the constituents were catalyzed with 1.5% based on the solid weight of polymer of Trignox C available from Akzo Chemical of Chicago, Ill. The control laminate was prepared following laminate build-up #3, except that the overlay layer did not have a deposit of bridging agent. Table 3 below contains the cove forming results obtained when the identified resins were used to form the laminates. The laminates were tested at various preheating times (measured in seconds) and a constant hold down time of 30 seconds.

TABLE 3

| | Cove Forming Ratings | | | |
|---|---|---|---|---|
| | 90/30* | 30/30 | 20/30 | 10/30 |
| color: black control | 1 | 2 | 2 | 3 |
| color: black 43.5% Resin 3 | 0 | 2 | 2 | 3 |
| color: black 43.5% Resin 4 | 0 | 0 | 0 | 3 |
| color: black 43.5% Resin 5 | 0 | 3 | 3 | 3 |
| color: black 43.5% Resin 6 | 0 | 0 | 0 | 2 |
| color: black 43.5% Resin 7 | 2 | 2 | 2 | 3 |

*Preheat time in seconds/hold down time in seconds.

Resin 6 had the best (lowest) cove forming ratings when compared with the other laminates using experimental resins and with the control laminate. Resin 6 represents a DAM-formaldehyde resin that was synthesized in bulk at a reaction temperature of 100° C. for a reaction time of 75 minutes. With the exception of Resin 7, each of the experimental resins exemplifying the bridging agent of the invention had better cove forming results than the control laminate (laminate build-up #3 without bridging agent).

Another set of cove forming results supporting the enhanced bond between the styrenated polyester top coat and melamine resin provided by use of the bridging agent of the invention can be seen in Table 4 below. Table 4 contains results for laminates prepared for comparing N-substituted melamine hybrid resin and a conventional melamine hybrid resin (UPE-Cymel): 1) Resin 2 is a hybrid of unsaturated polyester (MR1208A) and DAM at a 50:50 weight ratio; and 2) the UPE-Cymel resin is a hybrid made by reacting unsaturated polyester (MR1208A) with a commercially available melamine resin, Cymel 1156 (from Cytec Industries of West Patterson, N.J.) in a 50:50 weight ratio at 140° C. for 4 hours. Both of the solid hybrid resins were diluted to 43.5% by weight in isopropyl alcohol. For comparison, laminates were also prepared having two different concentrations, 20% and 43.5% by weight in isopropyl alcohol, of DAM to test the effect of DAM by itself as a bridging agent. The two DAM containing resins did not form homogenous solutions at room temperature due to the low solubility of DAM. Therefore, those resins further comprised 0.5% fumed silica in order to keep the excess DAM in suspension. Except for the control, which was prepared as laminate build-up #3 but with a trans layer without bridging agent, five experimental laminates were prepared as laminate build-up #1 laminates. The control' laminate was prepared as laminate build-up #1 without a trans layer and without any bridging agent.

TABLE 4

| | Cove Forming Ratings | | | |
|---|---|---|---|---|
| | 90/30* | 30/30 | 20/30 | 10/30 |
| color: black control | 1 | 2 | 2 | 3 |
| color: black control' | 3 | 3 | 3 | 3 |
| color: black 20% DAM | 1 | 1 | 1 | 2 |
| color: black 43.5% DAM | poor appearance testing abandoned | N/A | N/A | N/A |

TABLE 4-continued

| | Cove Forming Ratings | | | |
|---|---|---|---|---|
| | 90/30* | 30/30 | 20/30 | 10/30 |
| color: black 43.5% UPE-Cymel | 3 | 3 | 3 | 3 |
| color: black 43.5% Resin 2 | 0 | 0 | 0 | 1 |

*Preheat time in seconds/hold down time in seconds.

The results presented in Table 4 show that, except at a preheat/hold time of 90/30, DAM by itself as a bridging agent yields a laminate with better cove forming results than a control laminate with an overlay (or trans) layer without any bridging agent. The small blistering that occurred at the preheat/hold time of 90/30 may be attributable to the uneven coating that occurs when DAM is applied to the polyester top coat in spite of the addition of fumed silica. Hence, DAM alone improves the bond between a styrenated polyester topcoat and a melamine resin base. Comparing the control with a trans layer to control' without a trans layer, it is apparent that the trans layer used in the control did enhance the cove forming to a certain degree. In addition, the laminate prepared with Resin 2 had good cove forming results at each of the pre-heat times showing that the bridging agents of the invention improve the bond between polyester and melamine even without an overlay layer. The laminate made with the conventional melamine hybrid resin, UPE-Cymel, which does not have an N-substituted melamine, did not show any improvement over the control' laminate.

As discussed previously, the N-substituted melamines and resins of the invention can be prepared at various solids concentrations in isopropyl alcohol. In order to test the effect of solids concentration of the N-substituted melamine resins on effectiveness as bridging agents, various solids concentrations of resin in isopropyl alcohol were prepared. These materials were dissolved, or, in the case of DAM, suspended in isopropyl alcohol. In forming the experimental laminates, the liquid resins were catalyzed with 1.5%, based on weight of solids, of Trignox C. In order to observe improvements in the bond between the styrenated polyester and melamine resin layers, each "bridging agent" was used in a laminate having the form of laminate build-up #1 and made in a 18"×20" press. As before, the control laminate was made according to laminate build-up #3 except that no bridging agent was used on the trans layer. The cove forming results for each laminate are identified in Table 5.

TABLE 5

| | Cove Forming Ratings | | | |
|---|---|---|---|---|
| | 30/30* | 10/30 | 5/30 | 0/30 |
| control | 2 | 3 | 3 | 3 |
| 15% DAM | 0 | 2 | 2 | 2 |
| 10% DAM | 0 | 2 | 2 | 2 |
| 5% DAM | 0 | 2 | 2 | 2 |
| 24.4% Resin 2 | 0 | 1 | 2 | 2 |
| 10% Resin 2 | 0 | 1 | 2 | 2 |
| 24.4% these materials 1 | 0 | 2 | 2 | 2 |
| 10% Resin 1 | 0 | 2 | 2 | 2 |
| 30.8% Resin 6 | 0 | 2 | 2 | 2 |
| 17.3% Resin 6 | 0 | 2 | 2 | 2 |

*Preheat time in seconds/hold down time in seconds.

Resin 2, at both solids levels, had the best cove forming results of the laminates. The two solids levels of Resin 2 performed comparably. Each of the experimental laminates, even those with DAM alone, performed better than the control. Resin 1, having a ratio of unsaturated polyester to DAM of 65:35, performed as well as Resin 6, having a ratio of formalin to DAM of 25:75. As can be seen, the effectiveness of DAM monomer as a bridging agent in Table 5 is better than that demonstrated in Table 4. In principle, the laminate having 20% DAM in Table 4 should have performed at least equal to or better than the laminates with DAM monomer in Table 5 (5, 10, and 15% levels of DAM). The deviation may be a result of the difficulty associated with applying DAM evenly onto the polyester top coat.

In another set of experiments, the effect of a catalyst on the benefits provided by bridging agents of the present invention was tested. The bridging agent for each of these experiments was Resin 2 at a level of 24.4% solids in isopropyl alcohol. The effect of two different catalysts was tested: Trignox 141, a fast catalyst available from Akzo Chemical, was compared with Trignox C. Laminates having the structure of laminate build-up #1 were prepared in a 18"×20" press. The control laminate was prepared according to laminate build-up #3 without the bridging agent on the trans paper. The cove forming results for these laminates with varying catalysts and catalyst levels are shown in Table 6.

TABLE 6

| | Cove Forming Ratings | | | |
|---|---|---|---|---|
| | 30/30* | 20/30 | 10/30 | 5/30 |
| control | 3 | 3 | 3 | 3 |
| 1.5% Trignox C | 0 | 0 | 2 | 2 |
| 4% Trignox C | 0 | 0 | 2 | 2 |
| 1.5% Trignox 141 | 0 | 0 | 2 | 2 |
| 4% Trignox 141 | 1 | 0 | 1 | 2 |
| 1.5% Trignox C 2% Trignox 141 | 0 | 0 | 1 | 2 |

*Preheat time in seconds/hold down time in seconds.

While the laminate prepared with the combination catalyst, 1.5% Trignox C and 2% Trignox 141, performed the best in the cove forming testing, there did not appear to be a significant difference in performance between these laminates prepared with different catalysts and differing levels of catalysts.

The ability of the bridging agents of the invention to improve the bond between styrenated polyester and melamine resin has already been shown for laminates having laminate build-up #1, where the bridging agent is applied to the styrenated polyester. The bridging agents of the invention also improve the interfacial bond between styrenated polyester and melamine resin in laminates having laminate build-up #2 where the bridging agent is applied to the melamine-treated sheets. In order to demonstrate the benefits of the bridging agents of the invention, laminates having laminate build-up #2 were prepared with 1.5% Trignox C catalyst. The cove forming results for these laminates are shown in Table 7.

TABLE 7

| | Cove Forming Ratings | | | |
|---|---|---|---|---|
| | 90/30* | 30/30 | 20/30 | 10/30 |
| color: white control: no resin | 0 | 3 | 3 | 3 |

TABLE 7-continued

Cove Forming Ratings

|  | 90/30* | 30/30 | 20/30 | 10/30 |
|---|---|---|---|---|
| color: white 30% Resin 1 | 0 | 0 | 0 | 0 |
| color: white 86% Resin 7 | 0 | 0 | 0 | 1 |
| color: white 80% resin; the solid contains a mixture of 35% Resin 7 and 65% MR1208A polyester | 0 | 0 | 0 | 2 |
| color: black control | 2 | 3 | 3 | 3 |
| color: black 30% Resin 1 | 0 | 0 | 0 | 1 |
| color: black 86% Resin 7 | 0 | 0 | 0 | 2 |
| color: black 80% resin; the solid contains a mixture of 35% Resin 7 and 65% MR1208A polyester | 0 | 1 | 2 | 3 |

*Preheat time in second/hold down time in seconds.

Resin 1, an unsaturated polyester/DAM hybrid resin, performed the best at a solids level of 30% in both the white and black laminates. The mixture of 35% Resin 7, having DAM and formaldehyde, and 65% unsaturated polyester, though similar to Resin 1 in composition, apparently does not form a hybrid resin of comparable molecular structure, and therefore, the Resin 7 mixture did not perform as well as Resin 1. However, Resin 1, Resin 7, and the Resin 7 mixture substantially out-performed both the white and black laminate controls, which were prepared having a trans layer without a bridging agent of the invention.

The bridging agents of the invention also improve the performance of laminates made with laminate build-up #3 in which the bridging agent is applied to an overlay (or trans) paper layer. In order to show the effectiveness of the bridging agents for build-up #3 laminates, a control laminate (no bridging agent) and a series of laminates with Resin 2 were prepared. In the experimental laminates, Resin 2 was coated to 14 lb. trans paper on a Dixon lab scale treater. The 14 lb. overlay paper was paper available from Mead. The Dixon treater had two configurations: 1) "Dip and Squeeze" ("D&S"); and 2) "Gravure Flood" ("GF") coating. The treating speed was 14' per minute and the resin pick-up of the trans paper was determined by measuring the weight gain before and after the treating. All of the laminates were made in a 4'×10" press. The cove forming results for the control and experimental laminates were measured at 325° F. and 360° F. and are listed in Table 8.

TABLE 8

Cove Forming Ratings

|  | resin pickup (%) | treating method | 30/30* 325° F. | 10/60 325° F. | 5/60 325° F. | 5/60 360° F. |
|---|---|---|---|---|---|---|
| control color: white | 0 | N/A | 3 | 3 | 3 | 3 |
| 10% Resin 2 color: white | 15 | D&S | 0 | 0 | 0 | 0 |
| 7.5% Resin 2 color: white | 13 | GF | 0 | 0 | 0 | 0 |
| 5% Resin 2 color: white | 10 | GF | 0 | 1 | 1 | 2 |
| 2.5% Resin 2 color: white | 5 | GF | 0 | 2 | 2 | 2 |
| control color: black | 0 | N/A | 3 | 3 | 3 | 3 |
| 10% Resin 2 color: black | 15 | D&S | 0 | 0 | 0 | 0 |
| 7.5% Resin 2 color: black | 13 | GF | 0 | 0 | 0 | 0 |
| 5% Resin 2 color: black | 10 | GF | 0 | 0 | 1 | 2 |
| 2.5% Resin 2 color: black | 5 | GF | 0 | 0 | 2 | 2 |
| control color: print | 0 | N/A | 3 | 3 | 3 | 3 |
| 10% Resin 2 color: print | 15 | D&S | 0 | 0 | 0 | 0 |
| 7.5% Resin 2 color: print | 13 | GF | 0 | 0 | 0 | 0 |
| 5% Resin 2 color: print | 10 | GF | 0 | 2 | 1 | 2 |
| 2.5% Resin 2 color: print | 5 | GF | 0 | 3 | 2 | 3 |

*Preheat time in seconds/hold down time in seconds.

Resin 2 at the 7.5 and 10% levels in the white laminate showed a significant improvement in the interfacial bond between the styrenated polyester and melamine resin versus the control laminate. The same result was true for the black and print laminates as well. At the 7.5 and 10% Resin 2 levels, the percentage of resin pickup by the overlay paper layer ranged from 13 to 15. These results confirm that the bridging agents of the invention improve the interfacial bond between styrenated polyester and melamine resin, resulting in improved laminates, with both the presence and absence of an interpositioned overlay paper layer in the laminate.

Resins 8 and 9, described previously, also show excellent improvement in the performance of laminates made with them. Resins 8 and 9 are DAM-formaldehyde/unsaturated polyester hybrid resins. In order to demonstrate their benefit, Resins 8 and 9 were prepared as 50% solid solutions in solvent that was 30 wt. % acetone and 70% isopropyl alcohol and then they were coated onto the styrenated polyester layer of a series of laminates made by laminate build-up #1. As with the laminates in Table 8, the resins were applied using a Dixon lab scale treater in the Gravure coating configuration. The treating speed was 15' per minute. Due to the heaviness of the polyester film, the percentage of resin pick-up by the polyester film could not be determined. The gravure cylinder had 24 cells per inch. The laminates were made in a 18"×20" press. The cove forming of the laminates was measured at 325° F. and 360° F. and the results are reported in Table 9.

TABLE 9

Cove Forming Ratings

| color | resin | 10/60* 325° F. | 30/30 325° F. | 0/60 360° F. | 5/60 360° F. | 10/60 360° F. |
|---|---|---|---|---|---|---|
| control | None | 3 | 3 | 3 | 3 | 3 |
| black | Resin 8 | 0 | 0 | 0 | 2 | 0 |
| Dusty Jade Grafix | Resin 8 | 0 | 0 | 0 | 0 |  |

TABLE 9-continued

Cove Forming Ratings

| color | resin | 10/60* 325° F. | 30/30 325° F. | 0/60 360° F. | 5/60 360° F. | 10/60 360° F. |
|---|---|---|---|---|---|---|
| black | Resin 9 | 0 | 0 | | 0 | 0 |
| white | Resin 9 | 0 | 0 | | 0 | 0 |
| Dusty Jade Grafix | Resin 9 | 0 | | | 0 | 0 |
| Multifleck | Resin 9 | | | 0 | 0 | 0 |
| Antique White | Resin 9 | | | 0 | 0 | 0 |
| Natural Glaze | Resin 9 | | | 0 | 0 | 0 |
| Fiesta Bisque | Resin 9 | | | 0 | 0 | 0 |
| Natural Canvas | Resin 9 | | | 0 | 0 | 0 |
| Victorian Teal | Resin 9 | | | 0 | 0 | 0 |
| Cornflower Blue | Resin 9 | | | 0 | 0 | 0 |
| Moss Erosion | Resin 9 | | | 0 | 0 | 0 |

*Preheat time in seconds/hold down time in seconds.

Both Resin 8 and Resin 9 showed improved performance over the control laminate. These results demonstrate that an N-substituted melamine resin that is a DAM-formaldehyde/unsaturated polyester hybrid resin can significantly improve the performance of a laminate in which it is used.

The present invention further encompasses a method of forming a laminate with improved bonding between incompatible component layers. The method of the invention comprises a first step of preparing a bridging agent solution. The bridging agent solution can comprise an N-substituted melamine, an N-substituted melamine formaldehyde resin, a polyester hybrid N-substituted melamine hybrid N-substituted melamine formaldehyde resin, resin, an N-substituted melamine and acrylic resin or mixtures of these. The N-substituted melamine resin has the general formula previously described. After the bridging agent solution is prepared, the interface between the incompatible component layers is treated with a deposit of bridging agent solution by Gravure methods. The bridging agent solution can be deposited on one or the other, or both, of the incompatible component layers. Following deposit of the bridging agent solution, the component layers of the laminate are assembled. The component layers of a laminate can include, but are not limited to, from top to bottom, a clay-coated release paper, a polyester top coat, melamine-treated decorative sheet or sheets, and standard phenolic filler sheets. The top coat can be comprised of any appropriate unsaturated resin and the decorative sheet or sheets can be treated with any appropriate formaldehyde-reactive resin. The top coat component layer can comprise either a layer of unsaturated resin or one or more paper layer sheets impregnated with an unsaturated resin. The laminate may or may not include a trans paper between the incompatible layers, in this case, between the polyester top coat and melamine-treated sheet. "Trans paper" is an abbreviation for "translucent" or "transparent" paper and refers to the overlay paper. After assembly, the composite of the component layers of the laminate with deposited bridging agent solution are cured by heat and pressure as is known in the art. The cured laminates prepared according to the method of the invention have improved blister resistance and cove forming characteristics. Examples of laminates prepared according to the method of the invention have been described above in conjunction with the preparation of laminates demonstrating the improved blister resistance and cove forming characteristics.

In view of the description above, it is evident that the present invention for a bridging agent comprised of an N-substituted melamine or N-substituted melamine resin significantly improves the bond between incompatible component layers of a laminate. For example, the bridging agent is capable of improving the bonding between a top, protective coating layer in a laminate, such as an unsaturated polyester, and a formaldehyde reactive coating resin, such as melamine, used to impregnate the decorative layers of the laminate. The bridging agent of the present invention can be used with or without layer to improve the blister resistance and cove forming characteristics of the finished laminate by chemical means. The bridging agent of the invention is comprised of an N-substituted melamine, an N-substituted melamine formaldehyde resin, a hybrid N-substituted melamine or N-substituted melamine formaldehyde resin, or mixtures thereof. Further, the present invention encompasses a method of forming a laminate with improved bonding between the incompatible component layers.

Although reference has been made to the use of the present invention as a bridging agent between styrenated polyester and melamine resin for the purpose of explanation, it is understood that alternative top coats and impregnating resins could also be used to produce laminates realizing the benefits of using the bridging agent. Further, it is understood that the bridging agent can be used to improve bonding between other chemically incompatible resins that may be used in the various component layers of a laminate. The invention is also intended to encompass hybrid resins comprising N-substituted melamines or N-substituted melamine resins and unsaturated compounds such as polyesters and acrylics. It also will be apparent to those skilled in the art that various modifications and variations can be made in the formulation of the bridging agent, as well as in the performance of the method, without departing from the scope or spirit of the invention.

Other embodiments of the invention will be apparent to those skilled in the ort from consideration of the specification and practice of the invention disclosed herein. It is intended that the specification and examples be considered as exemplary only, with the true scope and spirit of the invention being indicated by the following claims.

What is claimed is:

1. A method of producing a laminate having improved bonding between incompatible component layers comprising the steps of:

preparing a bridging agent solution comprising an N-substituted melamine, an N-substituted melamine-formaldehyde resin, or an unsaturated polyester resin hybrid of an N-substituted melamine or an N-substituted melamine-formaldehyde resin, or mixtures thereof, and a solvent;

depositing the bridging agent solution at the interface between the incompatible component layers of the laminate;

assembling component layers of the laminate; and subjecting the component layers to heat and pressure.

2. The method of producing a laminate of claim 1 wherein the depositing step is performed by a gravure printing technique.

3. The method of producing a laminate of claim 1 wherein the bridging agent solution is deposited onto one or more of a top coat component layer, a decorative sheet component layer, or an interpositioned overlay paper component layer.

4. The method of producing a laminate of claim 1 wherein the bridging agent solution is comprised of a resin selected from the group consisting of a diallylmelamine-formaldehyde resin, a diallylmelamine-ethylenically unsaturated, non-styrenated polyester resin, a diallylmelamine-formaldehyde-unsaturated polyester resins or mixtures thereof and a solvent.

5. A laminate having improved bonding between incompatible component layers, wherein the laminate comprises, in a superimposed relationship:

a core of one or more resin impregnated filler sheet component layers;

one or more decorative sheet component layers impregnated with a formaldehyde-reactive resin;

a deposit of bridging agent solution comprising an N-substituted melamine, an N-substituted melamine-formaldehyde resin, or a polyester hybrid of an N-substituted melamine or an N-substituted melamine-formaldehyde resin, or mixtures thereof, and a solvent; and an unsaturated resin top coat component layer.

6. The laminate of claim 5 further comprising an overlay paper component layer having a deposit of bridging agent solution and located between the unsaturated resin top coat component layer and the decorative sheet component layer.

7. The laminate of claim 5 wherein the bridging agent solution is comprised of a resin selected from the group consisting of a diallylmelamine and formaldehyde resin, a diallylmelamine and an ethylenically unsaturated, non-styrenated polyester resin, a diallylmelamine formaldehyde polyester resin, or mixtures thereof, and a solvent.

8. A laminate having improved bonding between incompatible component layers, wherein the laminate comprises, in a superimposed relationship:

a core of one or more filler sheet component layers impregnated with a formaldehyde-reactive resin;

a deposit of bridging agent solution comprising an N-substituted melamine, an N-substituted melamine-formaldehyde resin, or a polyester hybrid of an N-substituted melamine or an N-substituted melamine-formaldehyde resin, or mixtures thereof, and a solvent; and one or more decorative sheet component layers impregnated with an unsaturated resin.

9. The laminate of claim 8 further comprising an overlay paper component layer having a deposit of bridging agent solution and located between the decorative sheet component layer and the filler sheet component layer.

10. The laminate of claim 8 wherein the bridging agent solution is comprised of a resin selected from the group consisting of a diallylmelamine and formaldehyde resin, a diallylmelamine and an ethylenically unsaturated, non-styrenated polyester resin, a diallylmelamine formaldehyde polyester resin, or mixtures thereof, and a solvent.

* * * * *

UNITED STATES PATENT AND TRADEMARK OFFICE
CERTIFICATE OF CORRECTION

PATENT NO.   : 6,159,331
DATED        : December 12, 2000
INVENTOR(S)  : Ying-Cheng Chou Page 1 of 1

It is certified that error appears in the above-identified patent and that said Letters Patent is hereby corrected as shown below:

Column 2,
Line 50, change "an" to -- a novel --.
Line 51, delete "novel".

Column 17,
Line 5, change "a" to -- order, in the following --.

Column 18,
Line 3, change "a" to -- order, in the following --.

Signed and Sealed this

Twenty-seventh day of November, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 6,159,331
DATED : December 12, 2000
INVENTOR(S) : Ying-Cheng Chou

It is certified that error appears in the above-identified patent and that said Letters Patent is hereby corrected as shown below:

Column 2,
Line 50, change "an" to -- a novel --.
Line 51, delete "novel".

Column 17,
Line 5, change "a" to -- order, in the following --.

Column 18,
Line 3, change "a" to -- order, in the following --.

Signed and Sealed this

Eleventh Day of December, 2001

*Attest:*

NICHOLAS P. GODICI
*Attesting Officer*    *Acting Director of the United States Patent and Trademark Office*